May 7, 1963 V. R. ABEL 3,088,134
EXPERIMENTAL BEE COLONY DEVICE
Filed Oct. 12, 1961 2 Sheets-Sheet 1
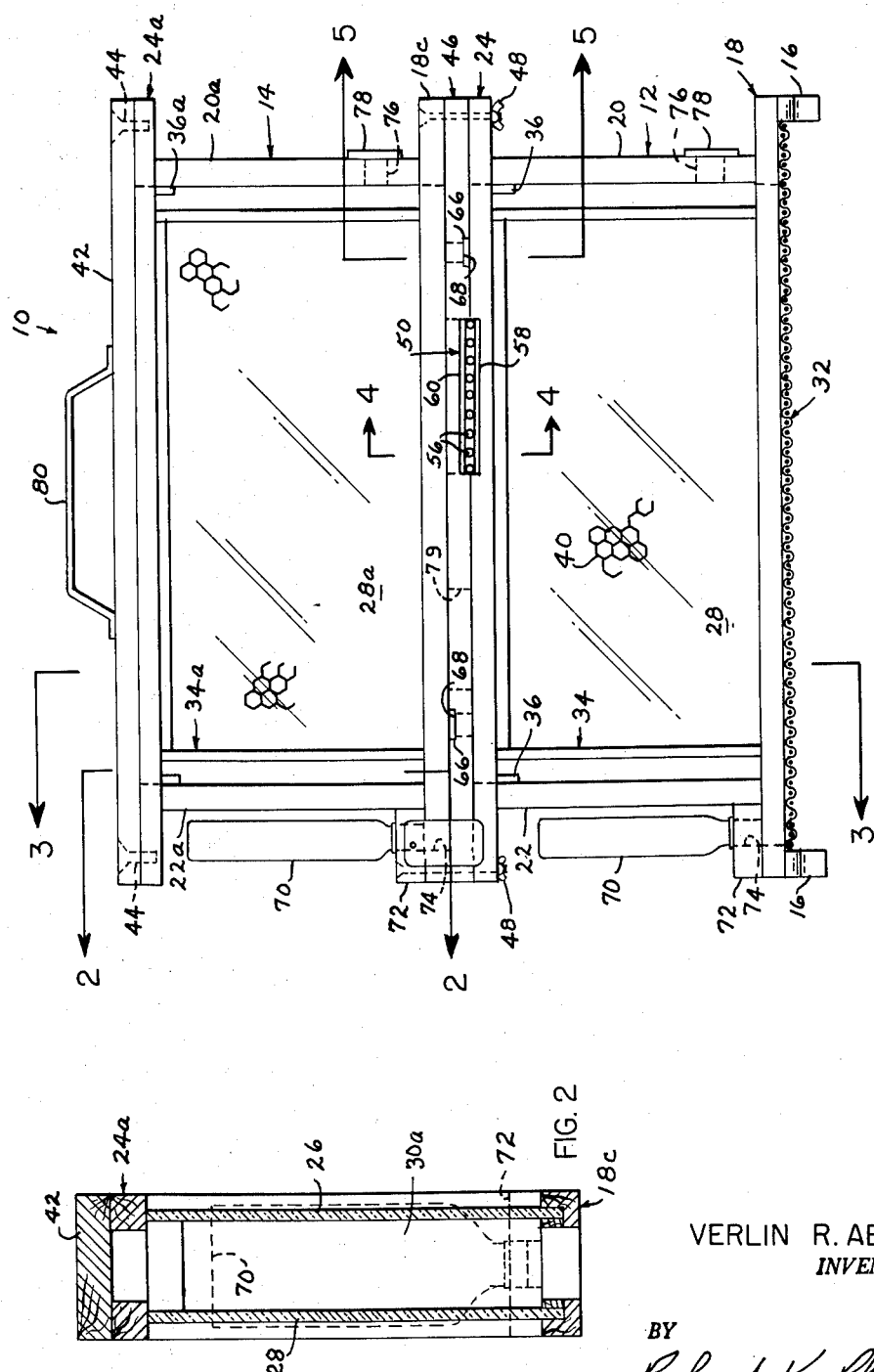
VERLIN R. ABEL
*INVENTOR.*
BY
*Robert K. Rhea*
AGENT

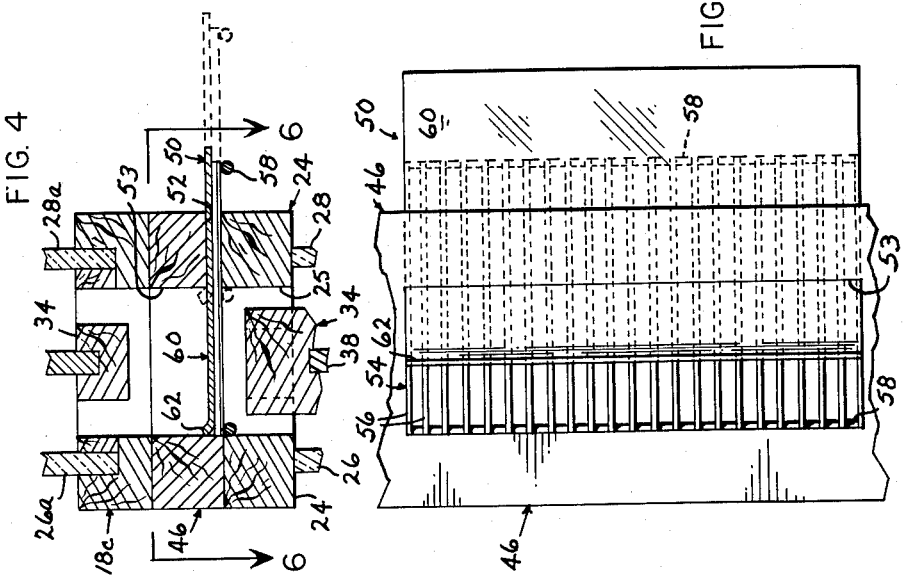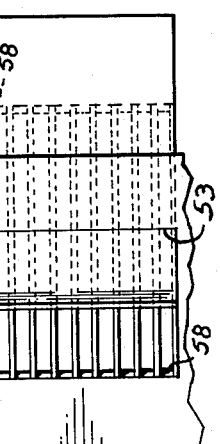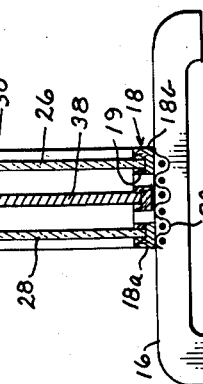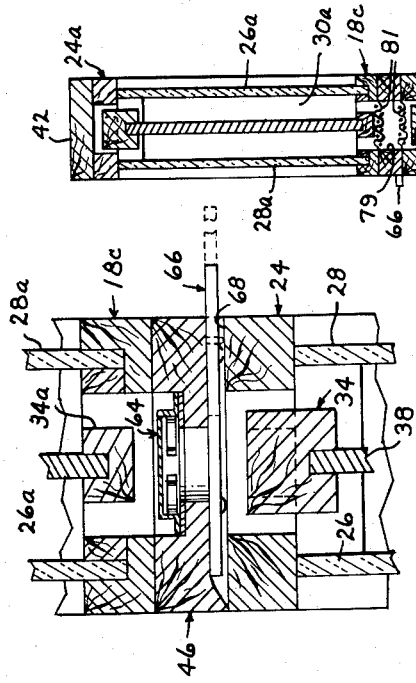
VERLIN R. ABEL
INVENTOR.
BY Robert K. Rhea
AGENT

United States Patent Office 3,088,134
Patented May 7, 1963

3,088,134
EXPERIMENTAL BEE COLONY DEVICE
Verlin R. Abel, 1518 Kinkaid Drive,
Oklahoma City, Okla.
Filed Oct. 12, 1961, Ser. No. 144,771
2 Claims. (Cl. 6—1)

The present invention relates to bees and more particularly to a device for studying a bee colony.

The principal object of the instant invention is to provide a housing for a colony of bees whereby the action of the bees may be observed.

Another object is to provide a device of this class which may be used as a device for schoolroom teaching.

Another object is to provide a bee colony experimental container wherein movement of the bees, from one part of the container to another section, may be selectively controlled.

An additional object is to provide a device of this class which is relatively light in weight and may be easily moved from one location to another and wherein the bee colony may be admitted to or removed from the device with ease.

Still another object is to provide a device of this class whereby the bees may be fed and permitted to make honey.

The present invention accomplishes these and other objects by providing a housing which includes a pair of sections in superposed relation with access openings therebetween. Each of the sections are provided with transparent opposing side walls.

Other objects will be apparent from the following description when taken in conjunction with the accompanying two sheets of drawings, wherein:

FIGURE 1 is a side elevational view of the device;

FIGURES 2, 3, 4 and 5, are vertical cross-sectional views, to an enlarged scale, taken substantially along the lines 2—2, 3—3, 4—4 and 5—5, respectively, of FIG. 1; and FIGURE 6 is a fragmentary top view taken substantially along the line 6—6 of FIG. 4.

Like characters of reference designate like parts in those figures of the drawings in which they occur.

In the drawings:

The reference numeral 10 indicates the housing device, as a whole, which includes a lower section 12 and preferably at least one upper section 14 with the lower section 12 mounted on base or support members 16. The section 12 is rectangular in general configuration and includes a rectangular elongated bottom member 18 provided with a central longitudinal slot or opening 19 defining spaced-apart bottom side members or rails 18a and 18b. The base members 16 extend transversely between and are connected to the bottom surface of the bottom member 18 adjacent its respective ends to hold the bottom member in spaced relation with respect to a supporting surface. A pair of end members 20 and 22, transversely substantially equal to the width of the bottom member 18, are rigidly connected to the upper surface of the bottom member, adjacent the respective ends of the opening 19, and extend upwardly therefrom in parallel relation. The upper ends of the end members 20 and 22 are connected to a horizontal top member 24, identical with respect to the bottom member 18. The top member 24 extends beyond the end members 20 and 22 co-extensive with the bottom member 18. Transparent side members 26 and 28, preferably formed of glass, have a portion of their end and downwardly disposed edge portions closely received within suitable co-operating grooves formed in the bottom rails 18a and 18b and end members 20 and 22. The uppermost edge of the respective glass panels 26 and 28 contiguously contacts the lower surface of the top member 24, thus, forming a compartment 30 which is open downwardly through the opening 19 in the bottom member 18 and which opens upwardly through the slot or opening 25 in the top member 24. The space 19 between the bottom member rails 18a and 18b is closed by a section of screen 32, or the like, for the purposes more fully explained hereinbelow.

A conventional honey comb frame 34 is centrally supported within the section 12 by suitable supporting blocks 36 secured to the inward surface of the respective end members 20 and 22 adjacent the upper ends thereof. The comb frame 34 is provided with a conventional sheet or membrane of wax 38 having the opposing sides thereof formed with hexagonal indentations 40, some of which are shown in FIG. 1.

The upper frame 14 is identical in construction with respect to the lower section 12 including a top member 24a, end members 20a and 22a, glass panels 26a and 28a and a bottom member 18c, forming a top compartment 30a containing a comb frame 34a supported by blocks 36a. A rectangular cap or plate 42 is secured to the top member 24a, of the upper section 14, by screws 44 to close the compartment 30a.

A divider or intermediate member 46 is interposed between the two sections. Thumb screws 48, removably secure the two sections 12 and 14 to the intermediate member 46.

A bee excluder 50 is interposed between the divider 46 and the top member 24 of the lower section within a suitable recess 52 formed in the divider. The divider 46 is provided with an opening 53 therethrough substantially equal with respect to the surface area of the excluder 50. The bee excluder 50 includes a conventional screen 54, composed of a plurality of spaced-apart parallel rod members 56, joined by similar rod members 58 connected to a common side of the rods 56, adjacent their respective ends. The spacing between the rods 56 is such that worker bees, not shown, may pass between the rods but which excludes the queen bee, not shown, because of her size. As shown by dotted lines in FIG. 4, the screen 54 may be manually moved outwardly of the device to permit passage of the queen bee from the lower compartment 30 to the upper compartment 30a or vice versa. A metallic panel 60, of substantially equal overall dimensions with respect to the screen 54, is superposed thereon so that when positioned inwardly of the device, as shown by the solid lines (FIG. 4), all bees will be excluded from passing from one frame to the other and when moved outwardly, as shown by the dotted lines, will permit the passage of worker bees through the screen 54. The inwardly disposed side surface of the plate 50 is arcuately turned upwardly, as at 62, to form a stop which contacts the inward surface of the divider 46 when the plate is moved outwardly of the device.

Conventional one-way passage bee excluders 64 are mounted on the divider 46 to permit passage of the bees, in a selected direction, between the sections 12 and 14. The one-way bee excluders 64 are closed by a bar member 66 movable into and out of a recess 68 formed in the respective upper and lower surfaces of the divider 46. Each of the frames 12 and 14 is provided, at one end, with a bee food container 70 which is mounted upon a block 72 secured to the upper surface of the respective bottom member 18 and 18c outward of the respective end member 22 and 22a. Each block 72 is provided with a central opening 74 whereby the bees may enter the latter and gather food from the feeders. Each of the section ends 20 and 20a is provided with an aperture 76, closed by a removable plate 78 for placing bees within the respective section or removing the bees therefrom.

As shown in FIG. 3, a rectangular opening 79 is formed in the divider 46 and closed by close woven wire screen 81 to permit circulation of air between the sections 12 and 14 when the excluders 50 and 64 are closed.

*Operation*

In operation the device is assembled, as described hereinabove, and bees, not shown, are placed within the selected section 12 or 14 by removing one of the plates 78 and inserting a plastic tube, or the like, not shown, through the opening 76 whereby the bees may pass from a container or hive, not shown, through the tube and into the device. The plate 78 is replaced and the bee food containers are filled with a desired quantity of food stuff. The bees then are free to feed and build honey comb on the respective sides of the wax membrane 38. The one-way bee excluders may be opened to permit bees to pass freely between the two sections, or, the bee excluder 50 may be operated to permit the passage of the worker bees or the queen bee from one section to the other. The sections 12 and 14 are sealed air tight, except for the openings through the divider 46. The screen closed space 19 in the bottom member 18 in the lower section 12 is for the purpose of admitting air into the spaces or compartments 30 and 30a to maintain bee life. A handle 80 is secured to the cap plate 42 for manually moving the device 10.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A device for observing an experimental bee colony, comprising: a pair of superposed relatively narrow rectangular frames each having bottom and top members joined by end members and having opposing transparent side walls secured to the bottom and end members and forming a compartment therebetween common to both said frames, said bottom and top members each having a longitudinal opening therethrough; support members transversely connected to the lower surface of said bottom; a cap plate overlying the top of the uppermost said frame and closing the opening therein; a screen secured to the lower surface of the bottom of the lowermost said frame between said members for closing the opening therein; a divider interposed between said frames, said divider having a vertical opening therethrough; and manually operated bee excluder means slidably secured to and spanning the opening in said divider for selectively excluding and permitting the passage of bees through the opening in said divider, said bee excluder means comprising a screen formed by a plurality of closely spaced parallel rods interconnected at their respective ends and slidably extending transversely across the opening in said divider and projecting laterally outward from one side of said frame, a panel co-extensive with and slidably superposed on said screen for closing the opening in said divider in cooperation with and independently of said screen.

2. Structure as specified in claim 1 and a block secured to said bottom member adjacent one end of said lowermost frame, said block having a vertical opening therethrough communicating with the longitudinal opening in said bottom; and a bee food container supported in an inverted position by the opening in said block.

References Cited in the file of this patent

UNITED STATES PATENTS

| | | |
|---|---|---|
| 1,113,886 | Douglass | Oct. 13, 1914 |
| 1,239,536 | Summerfield | Sept. 11, 1917 |
| 1,361,404 | Pritchard | Dec. 7, 1920 |
| 2,326,250 | O'Beirne | Aug. 10, 1943 |
| 2,575,102 | Evans | Nov. 13, 1951 |